United States Patent [19]
Ohe et al.

[11] Patent Number: 5,949,509
[45] Date of Patent: Sep. 7, 1999

[54] ACTIVE MATRIX LIQUID CRYSTAL DISPLAY DEVICE METHOD FOR CHECKING THE ALIGNMENT ABILITY OF A PHOTO-ALIGNMENT LAYER

[75] Inventors: Masahito Ohe; Shigeru Matsuyama; Masaaki Matsuda, all of Mobara, Japan

[73] Assignee: Hitachi, Ltd., Tokyo, Japan

[21] Appl. No.: 09/074,393

[22] Filed: May 8, 1998

[30] Foreign Application Priority Data

May 22, 1997 [JP] Japan .................................. 9-132371

[51] Int. Cl.[6] ...................... G02F 1/1337; G02F 1/1333; G02F 1/13; G01R 31/00
[52] U.S. Cl. ........................ 349/123; 349/122; 349/128; 349/187; 324/770
[58] Field of Search ................................... 349/124, 123, 349/128, 111, 130, 187; 359/240; 324/770

[56] References Cited

U.S. PATENT DOCUMENTS

| | | | |
|---|---|---|---|
| 4,917,472 | 4/1990 | Margerum et al. | 349/130 |
| 5,389,698 | 2/1995 | Chigrinov et al. | 349/124 |
| 5,600,464 | 2/1997 | Ohe et al. | 349/123 |
| 5,708,522 | 1/1998 | Levy | 359/240 |
| 5,781,261 | 7/1998 | Ohta et al. | 349/111 |
| 5,793,459 | 8/1998 | Toko | 349/128 |

OTHER PUBLICATIONS

Matsumoto et al. "LP–A: Display Characteristics of In–Plane–Switching (IPS) LCDs and a Wide–Viewing–Angle 14.5–in. IPS TFT–LCD" EuroDisplay '96 pp. 445–448, Oct. 1996.

*Primary Examiner*—William L. Sikes
*Assistant Examiner*—Kari M. Horney
*Attorney, Agent, or Firm*—Antonelli, Terry, Stout & Kraus, LLP

[57] ABSTRACT

A first substrate has at least scanning signal electrodes, video signal electrodes and pixel electrodes, all of which constitute display pixels, and active elements. A first alignment layer is formed, directly or via an insulating layer, as a top layer on the electrodes constituting the display pixels and the active elements. A second substrate which is bonded to the first substrate with a very small interval provided in between is provided with a second alignment layer that is formed so as to confront the first alignment layer. A liquid crystal layer is provided in a space between the first and second alignment layers. The electrodes constituting the display pixels are formed so as to apply, to the liquid crystal layer, an electric field that is substantially parallel with the surfaces of the first and second substrates and are connected to an external control device for controlling the electric field in accordance with a desired display pattern. Polarizing plates change an optical characteristic of light to be output from the second substrate in accordance with the alignment state of the liquid crystal layer that is produced by the electric field applied to the liquid crystal layer. At least one of the first and second alignment layers has been given alignment ability by illumination with polarized light.

10 Claims, 8 Drawing Sheets

DIRECTION OF SIGNAL FLOW

5,949,509

ACTIVE MATRIX LIQUID CRYSTAL DISPLAY DEVICE METHOD FOR CHECKING THE ALIGNMENT ABILITY OF A PHOTO-ALIGNMENT LAYER

BACKGROUND OF THE INVENTION

The present invention relates to a liquid crystal display device of a type in which the alignment of a liquid crystal is controlled by applying to the liquid crystal layer electric fields that are parallel to the substrates between which the liquid crystal material is disposed. In particular, the invention relates to an active matrix liquid crystal display device that is improved in both viewing angle and display uniformity, a method for forming a photo-alignment layer for such a display device, and a method for checking the alignment ability of the photo-alignment layer.

Liquid crystal display devices are now widely used as devices for displaying various kinds of images, including a still image and a moving image.

Those liquid crystal display devices are basically classified into two types. In the first type, a liquid crystal panel is configured such that a liquid crystal layer is held between two substrates, at least one of which is made of transparent glass or the like, and pixels are turned on or off by selectively applying voltages to various pixel forming electrodes that are formed on the substrates of the liquid crystal panel. In the second type, various electrodes as mentioned above and pixel selecting active elements are formed, and pixels are turned on or off by effecting selection among the active elements.

In particular, the second type of liquid crystal display device, which is called an active matrix type device, is now the most used because it is superior in contrast performance, high-speed display performance, etc. Previous active matrix liquid crystal display devices have been of the so-called vertical electric field type in which electric fields for changing the alignment direction of the liquid crystal layer are generated in a direction transverse to the substrates between electrodes formed on one substrate and an electrode formed on the other substrate.

In recent years, liquid crystal display devices of the so-called lateral electric field type (also called the inplane switching or IPS type) have been realized in which the directions of the electric fields generated in the liquid crystal layer are approximately parallel with the substrate surfaces. Among liquid crystal display devices of this type is one in which a very wide viewing angle is obtained by forming comb-teeth-shaped electrodes on one of the two substrates (refer to Japanese Examined Patent Publication No. Sho. 63-21907 and U.S. Pat. No. 4,345,249).

On the other hand, a typical example of a method of aligning liquid crystal molecules of a liquid crystal layer in a predetermined direction provides an organic polymer thin film of, for instance, a polyimide type material, on a substrate and gives it an alignment ability by rubbing it. Such organic alignment layers have been put into practical use.

In another method (optical alignment method), alignment ability is imparted to an organic polymer thin film of, for instance, a polyimide type material formed on a substrate by illuminating it with light (refer to U.S. Pat. No. 4,974,941 and Japanese Unexamined Patent Publication Nos. Hei. 5-34699, Hei. 6-281937 and Hei. 7-247319).

However, these conventional optical alignment techniques have not been applied to the above-mentioned lateral electric field type display device. No consideration has been given heretofore to the remarkable effects that would be obtained when such optical alignment techniques are applied to the lateral electric field type display device, which has a different design concept than the vertical electric field type display device in which various pixel forming electrodes are formed on both substrates.

Although vertical electric field type active matrix liquid crystal display devices according to the conventional techniques can attain a wider viewing angle than twisted nematic type liquid crystal display devices, they have various problems, such as low display uniformity in large-size screens, the existence of a limit in increasing the viewing angle, and yellow or blue coloration in particular directions.

What is called the pre-tilt angle depends on the kind of polyimide-type polymer material used in an alignment layer. With a large pre-tilt angle, there is a problem that the viewing angle characteristic is not good and depends on the rubbing conditions.

Lateral electric field type devices, in which the alignment direction of liquid crystal molecules of a liquid crystal layer in the top substrate is the same as in the bottom substrate generally employ what is called a normally black scheme in which a black display is effected when no voltage is applied and a white display is effected when a voltage is applied. This scheme has a disadvantage in that display abnormalities due to display defects are more remarkable than in what is called a normally white scheme in which a white display is effected when no voltage is applied and which is employed in conventional twisted nematic type devices.

In the case of the homogeneous alignment of liquid crystal molecules, a slight alignment abnormality causes marked problems in the display.

The lateral electric field scheme has a disadvantage in that a slight variation in cell gap (interval between the two substrates of a liquid crystal panel, i.e., the thickness of a liquid crystal layer) causes a display non-uniformity, because the driving is performed according to the principle that the liquid crystal responds to the electric field rather than to a voltage.

On the other hand, the method of providing alignment ability by a rubbing treatment tends to cause static electricity on the film and to contaminate the film surface. Static electricity that is generated on an alignment layer by the rubbing treatment may destroy a thin-film transistor (TFT) operating as an active element or alter its switching characteristic. If an alignment layer is contaminated by the rubbing treatment, the frequency dependence of the threshold voltage of a pixel is made non-uniform. Further, since it becomes more difficult to properly control the load of the rubbing over the entire substrate area as the substrate size increases, the rubbing treatment may cause a scratch or unevenness in large-size substrates.

When rubbed with a cloth in a rubbing step, an alignment layer generates minute shavings and hence becomes a great source of dust in a clean room where liquid crystal display devices are manufactured, that is, a large factor in reducing yields of other related manufacturing steps. This is a serious problem.

Because of the existence of various pixel forming electrodes and asperities that result from the structure of active elements, such as TFTs, the substrate surface has height differences, which result in portions that are not rubbed in the rubbing step. Those portions may allow the passage of light during black display, which results in a contrast reduction.

SUMMARY OF THE INVENTION

A first object of the present invention is to solve the above-mentioned problems by providing a lateral electric field type active matrix liquid crystal display device which can provide a high-quality image display by attaining both a wide viewing angle and such a high display uniformity that display abnormalities are unrecognizable.

A second object of the invention is to provide a method of forming an alignment layer for the above liquid crystal display device.

A third object of the invention is to provide a method of checking the alignment ability of an alignment layer formed by the above alignment layer forming method.

The first object of the invention is attained by the following active matrix liquid crystal display devices.

(1) An active matrix liquid crystal display device and a second substrate, the first substrate having a first substrate comprising scanning signal electrodes, video signal electrodes, and pixel electrodes, all of which constitute display pixels, and active elements, the electrodes constituting the display pixels being formed so as to apply to a liquid crystal layer an electric field that is substantially parallel with the surfaces of the first substrate and the second substrate, and being connected to external control means for controlling the electric field in accordance with a desired display pattern; a first alignment layer formed directly, or via an insulating layer, as a top layer on the electrodes constituting the display pixels and the active elements; the second substrate being bonded to the first substrate with a very small interval provided in between, the second substrate being provided with a second alignment layer that is formed so as to confront the first alignment layer; the liquid crystal layer being provided in a space between the first and second alignment layers; and polarizing means for changing an optical characteristic of light to be output from the second substrate in accordance with the alignment state of the liquid crystal layer that is produced by the electric field applied to the liquid crystal layer; at least one of the first and second alignment layers having an alignment ability produced by illumination thereof with polarized light.

(2) In the device of item (1), the pre-tilt angle at the interface between the first alignment layer and the first substrate is different from the pre-tilt angle at the interface between the second alignment layer and the second substrate.

(3) In the device of item (1), each of the first and second alignment layers is made of a polyimide-type polymer material.

(4) In the device of item (3), the alignment layer that has been given an alignment ability by illumination thereof with polarized light is made of a polyimide-type polymer material in which photochromic units are introduced chemically.

(5) In the device of item (1), each of the-first and second alignment layers has two or more alignment directions when no electric field is applied.

(6) In the device item (1), the liquid crystal layer has a resistivity value smaller than $10^{13} \Omega$. cm.

(7) In the device of item (1), the insulating film has a thickness of 0.3 $\mu$m or more.

(8) In the device of item (1), the surface of the first substrate adjacent to the liquid crystal layer has height differences of 0.3 $\mu$m or more.

(9) In the device of items (1) to (8), one of the first and second alignment layers is given an alignment ability by rubbing.

The second object of the invention is attained by the following alignment layer forming methods.

(10) A method of forming an alignment layer to be used in an active matrix liquid crystal display device comprising a first substrate and a second substrate, the first substrate having scanning signal electrodes, video signal electrodes, and pixel electrodes, all of which constitute display pixels, and active elements, the electrodes constituting the display pixels being formed so as to apply to a liquid crystal layer an electric field that is substantially parallel with the surfaces of the first substrate and the second substrate, and being connected to external control means for controlling the electric field in accordance with a desired display pattern; a first alignment layer formed directly, or via an insulating layer, as a top layer on the electrodes constituting the display pixels and the active elements; the second substrate being bonded to the first substrate with a very small interval provided in between, the second substrate being provided with a second alignment layer that is formed so as to confront the first alignment layer; the liquid crystal layer is provided in a space between the first and second alignment layers; and polarizing means for changing an optical characteristic of light to be output from the second substrate in accordance with the alignment state of the liquid crystal layer that is produced by the electric field applied to the liquid crystal layer, the method comprising the steps of forming a thin film made of a polyimide-type polymer material as an alignment layer serving as a first or second alignment layer on the surface of a substrate that is the first or second substrate; and applying polarized light to the polyimide-type polymer thin film while moving the substrate at a constant feed speed, to thereby impart an alignment ability to the alignment layer.

(11) In the method of item (10), the polyimide-type polymer material is one in which photochromic units are introduced chemically.

(12) In the method of item (10), the polarized light is applied in two or more directions.

The third object is attained by the following alignment ability checking method.

(13) A method of checking the alignment ability of an alignment layer, comprising the step of checking whether alignment ability has been imparted to an alignment layer that has been formed by the alignment layer forming method of any of items (10) to (12) teased on a result of an examination as to whether an alignment control state exists before and after the substrate on which the alignment layer is formed is heated at approximately 180° C. for 10 minutes.

DETAILED DESCRIPTION OF THE PREFERRED EMBODIMENTS

In usual liquid crystal display devices, the above-mentioned rubbing step is executed to uniformly align the liquid crystal molecules of a liquid crystal layer. In the rubbing treatment (the other term "rubbing method" will also be used below), the surface of a polyimide-type polymer thin film formed on a substrate is rubbed with a cloth that is wound on a roller. In principle, the ability to align the liquid crystal molecules (alignment ability) that is produced by such a rubbing process does not disappear unless the surface temperature of the polyimide-type polymer thin film becomes higher than its glass transition temperature. Since polyimide-type polymer thin films have very high glass transition temperatures, the liquid crystal alignment ability is not lost even when heating the device to 180° C. or more is carried out, which temperature is sometimes necessary to cure a sealing member for bonding the two substrates together.

On the other hand, it is possible to produce alignment ability by illuminating a polyimide-type polymer thin film with polarized light. Concentrated studies by the inventors have revealed that in the lateral electric field type device an even wider viewing angle can be obtained and the display uniformity can be greatly improved by using an alignment layer obtained by illuminating a polyimide-type polymer thin film with polarized light.

It has been confirmed that, in an alignment layer that has been given alignment ability by illuminating a polyimide-type polymer thin film with polarized light, what is known as the pre-tile angle is almost zero and the anchoring strength that binds the alignment of a liquid crystal is weaker than in the case where rubbing treatment is used.

This explains why both the viewing angle and the display uniformity are greatly improved by the invention, that is, by combining a lateral electric field type liquid crystal display device with an alignment layer that is given alignment ability by illuminating a polyimide-type polymer thin film with polarized light as described above.

However, an examination of alignment layers that were given alignment ability by illumination with polarized light revealed that the alignment ability disappears when the liquid crystal panel of the liquid crystal display device is heated at 180° C. or more for about 10 minutes. This phenomenon never happens with the rubbing method. Therefore, conversely, whether alignment ability has been produced by illumination with polarized light can be checked by conducting such heating.

That is, this phenomenon can be utilized to check for the manifestation of alignment ability in the method of illuminating a polyimide-type polymer thin film with polarized light.

Figure 8:
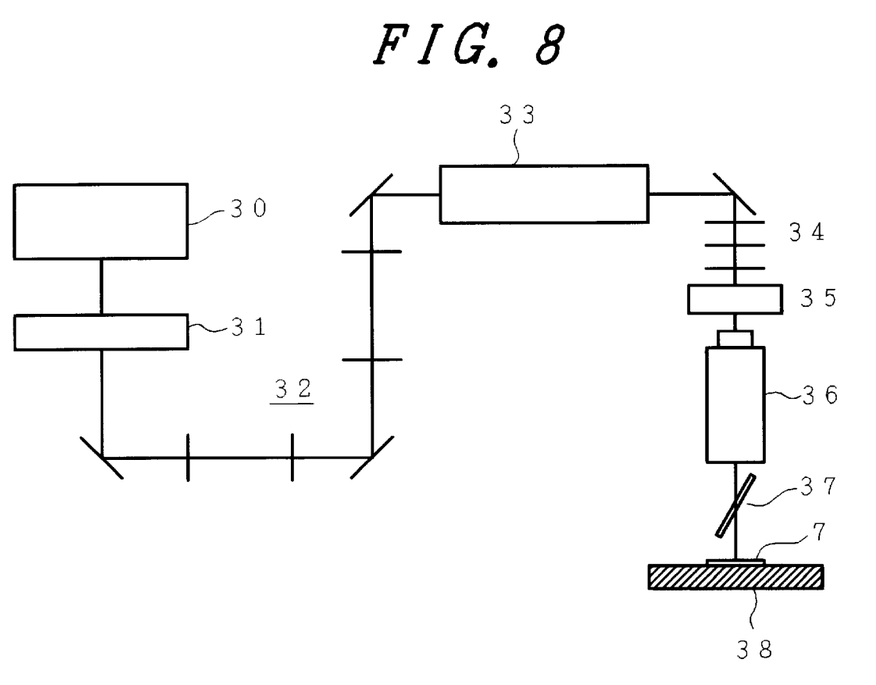
FIG. 8 is a block diagram which schematically shows an example of a polarized light illumination method for imparting alignment ability by illuminating a polyimide-type polymer thin film with polarized light.

FIG. 8 schematically shows an example of a polarized light illumination method for imparting alignment ability by illuminating a polyimide-type polymer thin film with polarized light. In the figure, a substrate 7 supported on a sampling stage 38 is illuminated by an excimer laser 30 (wavelength: 248 nm), operating as a light source, via an attenuator 31, relay optical systems 32 and 34, a homogenizer 33, a mask 35, a projection lens 36 and a polarizer 37.

Referring to FIG. 8, the substrate 7 on which a polyimide-type polymer thin film is formed is mounted on a feedable sampling stage 38. Laser light that is emitted from the excimer laser 30 is passed through the attenuator 31 and the relay optical system 32 and then made uniform by the homogenizer 33. The laser light is then input to the polarizer 37 via the relay optical system 34, the mask 35, and the projection lens 36. The laser light that has been polarized in a predetermined direction by the polarizer 37 is applied to the polyimide-type polymer thin film on the substrate 7 mounted on the sampling stage 38, which is fed at a constant speed in a predetermined direction. As a result, desired alignment ability is given to the polyimide-type polymer thin film.

Figure 9:
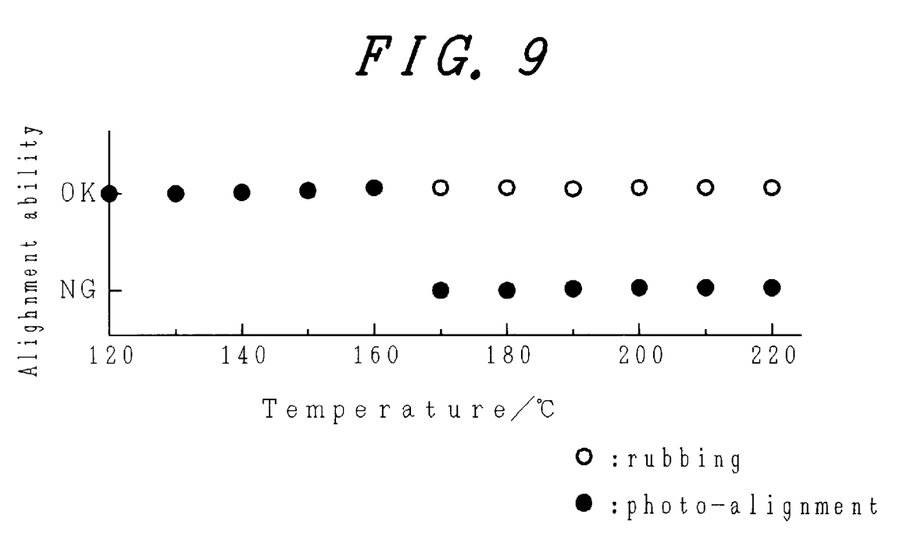
FIG. 9 is a graph showing results of an experiment in which the presence/absence of alignment ability was checked when an alignment layer that had been given alignment ability by the optical alignment method and an alignment layer that had been given alignment ability by the rubbing method were heated for 10 minutes.

FIG. 9 is a graph showing results of an experiment in which the presence/absence of alignment ability was checked when an alignment layer that had been given alignment ability by the optical alignment method and an alignment layer that had been given alignment ability by the rubbing method were heated for 10 minutes. Black circles correspond to the optical alignment method and white circles correspond to the rubbing method.

As shown in FIG. 9, the alignment ability of the alignment layer that has been imparted by the optical alignment method deteriorates when the heating temperature exceeds 170° C. On the other hand, the alignment ability of the alignment layer that has been imparted by the rubbing method does not deteriorate even when the heating temperature exceeds 180° C.

By utilizing the above feature, the presence/absence of alignment ability of an alignment layer according to the optical alignment method can easily be checked.

The polyimide-type polymer thin films used in the above experiment were made of a polyimide-type polymer material composed of a diamine component and a dianhydride anhydride. Other materials having photochromic parts, such as azobenzene, stilbenzene, and cinnamate, may also be used.

The pre-tilt angle of the alignment of liquid crystal molecules caused by illuminating a polyimide-type polymer thin film with light is small. Therefore, asymmetrical tilt angles of the top and bottom substrates can easily be obtained by applying light to one of the top and bottom substrates and performing the usual rubbing treatment on the other substrate. Such asymmetry is effective in increasing the response speed of a liquid crystal.

The viewing angle characteristic is further improved by providing two or more initial alignment directions to a liquid crystal layer (when no voltage is applied) by the above method that uses light.

In the case of homogeneous alignment in one direction, liquid crystal molecules are directed in the same direction when a voltage is applied and coloration occurs in oblique directions along the major-axis and minor-axis directions of the director, respectively, due to differences in birefringence in those directions. On the other hand, where two (or more) initial alignment directions are provided, liquid crystal molecules are directed in two directions when a voltage is applied, whereby optical compensation is effected and no coloration occurs. This is what is called the multi-domain method.

Conventionally, in the lateral electric field scheme, multi-domain treatment can be performed by changing the electrode wiring structure. However, this method has a problem in that it produces a reduction in the aperture ratio. On the other hand, where liquid crystal molecules are aligned by applying polarized light to an alignment layer that is a polyimide-type polymer thin film, multi-domain treatment can be performed without changing the electrode structure. In addition, superior display uniformity can be attained because of the above mentioned features of a small pre-tilt angle, a wide viewing angle, and low anchoring strength.

It is known that illuminating a polyimide-type polymer thin film with polarized light causes a tendency for a charge to be stored on the illuminated surface. As a result, a DC component is prone to be stored in the liquid crystal panel, possibly causing an afterimage. By making the resistivity of a liquid crystal smaller than $10^{13}\Omega$. cm, the after image phenomenon can be reduced through charge compensation in the liquid crystal.

In the case of the rubbing method, height differences on the substrate surface produce unrubbed regions, which may lower the contrast. In contrast, where light is used for liquid crystal alignment, no such phenomenon occurs and height differences even larger than 0.3 µm cause no problems.

The invention will be described in detail hereinafter with reference to various embodiments.

Embodiment 1

Figure 1:
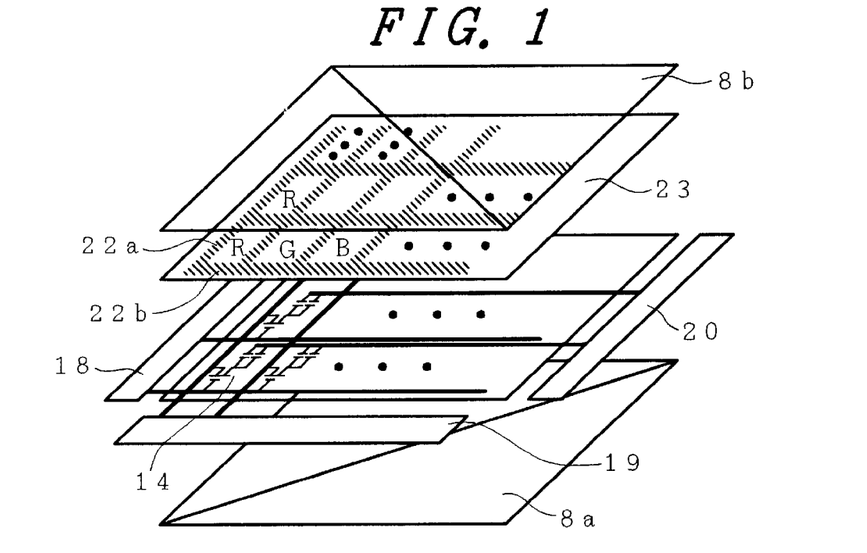
FIG. 1 is a perspective diagram view conceptually shows the entire configuration of an active matrix liquid crystal display device according to the present invention.

FIG. 1 conceptually shows the overall configuration of an active matrix liquid crystal display device according to the invention. The display device includes a bottom polarizing plate 8a, atop polarizing plate 8b, thin-film transistors 14 (TFTs) as active elements, a scanning electrode driving circuit 18, a signal electrode driving circuit 19, a common electrode driving circuit 20, a black matrix 22a and 22b, and color filters 23.

This liquid crystal display device is of what is called the lateral electric field (IPS) type. The several kinds of pixel selection electrodes and the switching elements are formed on one of the substrates (usually the bottom substrate) and only the color filters are formed are formed on the other substrate (top substrate). Electric fields approximately parallel with the substrate surfaces are formed in a liquid crystal layer that is held between the two substrates. The pixel on/off-control is performed by changing the alignment direction of liquid crystal molecules of the liquid crystal in the plane parallel with the substrates.

Figure 2:
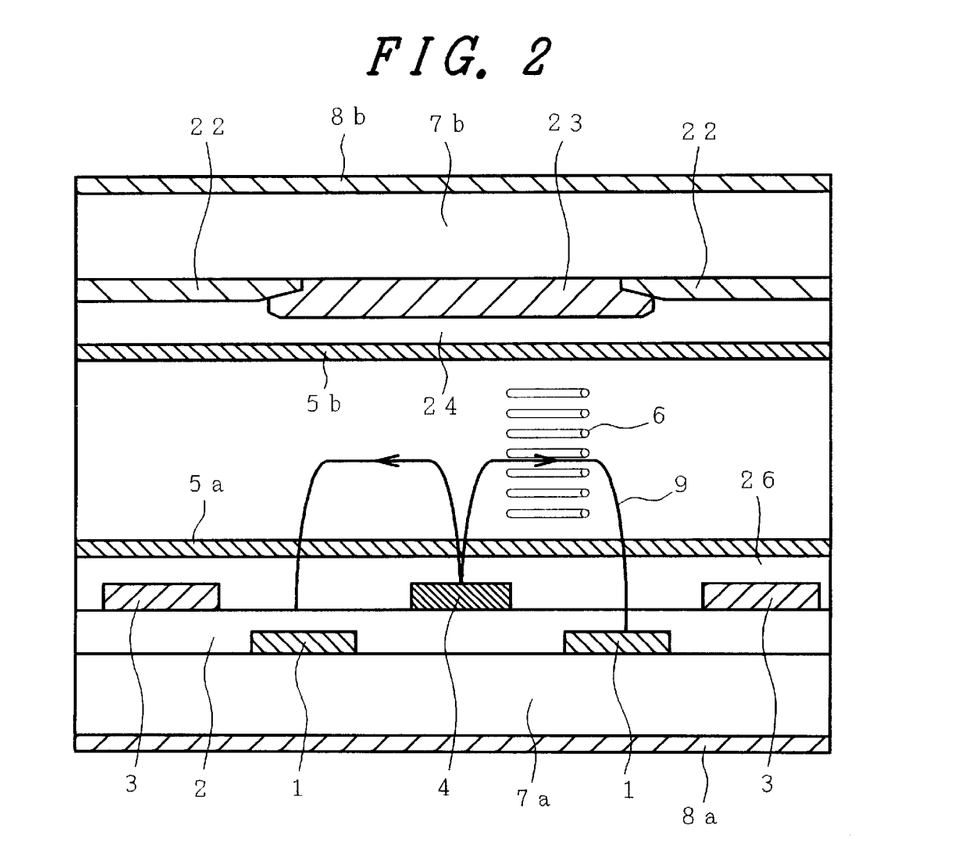
FIG. 2 is a sectional view of one-pixel portion of the liquid crystal display device of FIG. 1.

FIG. 2 is a sectional view of one-pixel portion of the liquid crystal display device of FIG. 1. Reference symbol 1 denotes a common electrode; 2, a gate insulating film; 3 denotes video signal electrodes; 4 denotes a pixel electrode; 5a denotes a bottom alignment layer; 5b denotes a top alignment layer; 6 denotes liquid crystal molecules; 7a denotes a bottom substrate; 7b denotes a top substrate; 8a denotes the bottom polarizing plate; 8b denotes the top polarizing plate; 9 denotes electric fields; 22 denotes the black matrix; 23 denotes the color filters; 24 denotes an overcoat film; and 26 denotes a passivating film (PSV).

Referring to FIG. 2, the thin-film transistors 14 (see FIG. 1), the video signal electrodes 3 for driving the liquid crystal, and the common electrode 1 are formed on a silicon nitride (SIN) film provided in the form of an insulating film 2 that is formed on the bottom substrate 7a. The passivating film 26 is formed so as to cover those electrodes. The color filters 23 are formed on the top substrate 7b so as to be sectioned by the black matrix 22. The liquid crystal layer consisting of the liquid crystal molecules 6 is held between the bottom alignment layer 5a and the top alignment layer 5b that are formed on the confronting surfaces of the substrates 7a and 7b. The bottom polarizing plate 8a and the top polarizing plate 8b are laid on the outside surfaces of the bottom substrate 7a and the top substrate 7b, respectively. In consideration of corrosion of metals, the video signal electrodes 3 and the common electrode 1 that are in direct contact with the alignment layer 5a and the liquid crystal layer are made of ITO (indium tin oxide).

Figure 3:
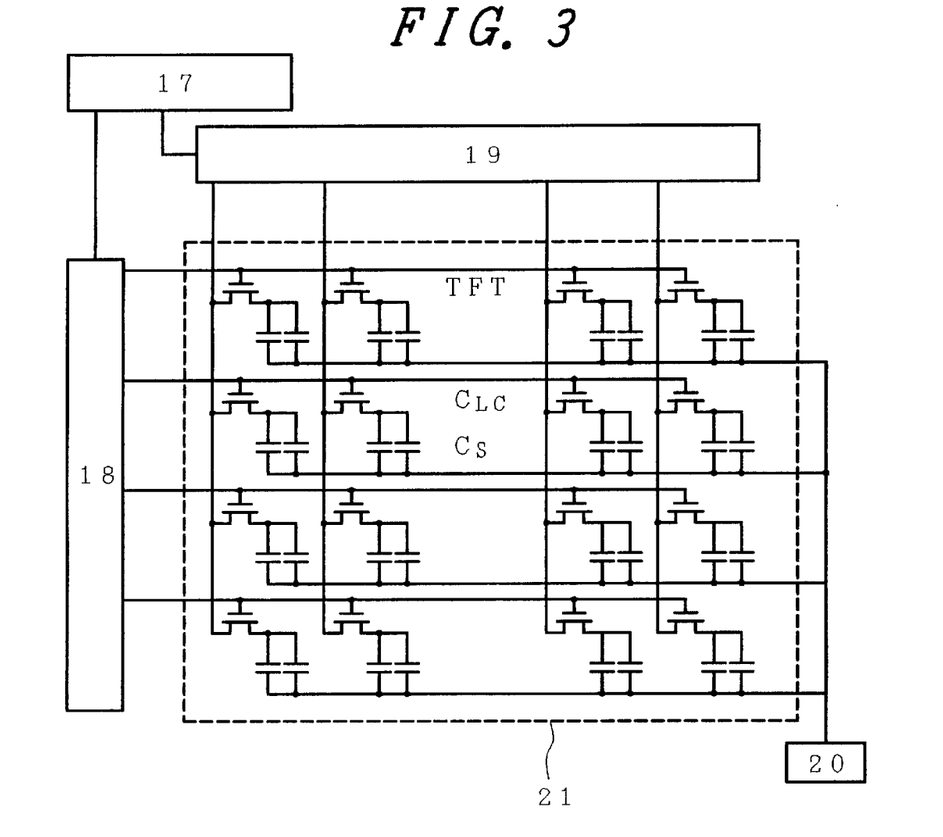
FIG. 3 is a schematic circuit diagram of driver circuits of the active matrix liquid crystal display device of FIG. 1.

FIG. 3 is a conceptual circuit diagram of the driver circuits of the active matrix liquid crystal display device of FIG. 1. Reference numeral 17 denotes a control circuit; 18 denotes the scanning electrode driving circuit) 19 denotes the signal electrode driving circuit; 20 denotes the common electrode driving circuit; and 21 denotes the active matrix liquid crystal display device. Symbols $C_{LC}$ and $C_S$ denote capacitance components of the liquid crystal and storage capacitors, respectively.

The TFTs for switching the respective pixels of the active matrix liquid crystal display device 21 are selectively turned on or off by the scanning electrode driving circuit 18, the signal electrode driving circuit 19, and the common electrode driving circuit 20 under the control of the control circuit 17.

The alignment directions of the liquid crystal molecules 6 of the liquid crystal layer are varied as the TFTs are turned on or off. The initial alignment direction of the liquid crystal molecules 6 is set by the alignment control states (alignment ability) of the bottom and top alignment layers 5a and 5b that are formed on the respective substrates 7a and 7b.

In this embodiment, each of the alignment layers 5a and 5b is made of polyimide, and polarized light UV is applied to the surface of the polyimide film to impart alignment ability to that surface. A KrF excimer laser (wavelength: 248 nm) is used as a light source for emitting the polarized light UV. The illumination energy density is set at 5 mJ/cm$^2$ and 76 shots of light are applied. The bottom substrate 7a on which the alignment layer 5a is formed is fed at a constant speed, which is set so that the illumination surface is uniformly illuminated with 76 shots of polarized light UV.

After polyimide is applied to the surface of the top substrate 7b, which serves as the color filter substrate, the polyimide film is illuminated with polarized light UV in the same manner as in the above case. The liquid crystal molecules 6 are aligned in a direction perpendicular to the polarization direction of the polarized light UV.

Figure 4:
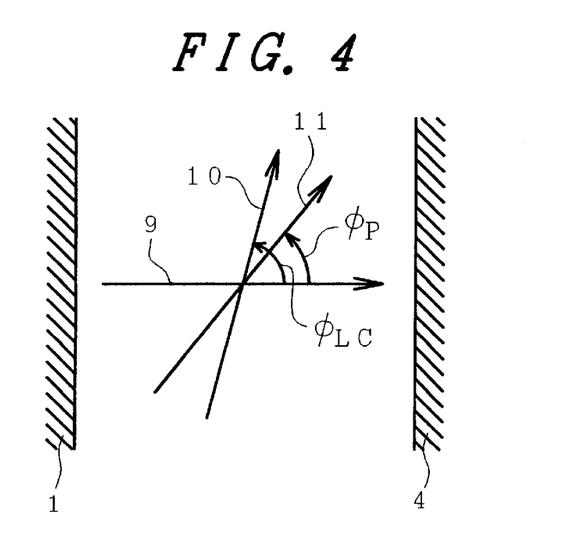
FIG. 4 is a diagram which illustrates the definitions of an alignment control direction of an alignment layer and a polarizing plate transmission axis direction.

FIG. 4 illustrates the definitions of an alignment control direction of an alignment layer and a polarizing plate transmission axis direction. Reference numeral 9 denotes an electric field direction; 10 denotes alignment control directions of the alignment layers 5a and 5b; and 11 denotes a polarizing plate transmission axis direction.

In this embodiment, as shown in FIG. 4, the easily alignable axes of the molecule of the liquid crystal at the interfaces between the liquid crystal and the bottom and top alignment layers 5a and 5b are set so as to be approximately parallel with each other and to form an angle 75° with the electric field direction 9 ($\phi_{LC1}=\phi_{LC2}=75°$).

The liquid crystal layer is formed by interposing, between the substrates 7a and 7b, a nematic liquid crystal composition having a positive dielectric constant anisotropy value $\Delta\epsilon=7.3$ and a refractive index anisotropy value $\Delta n=0.074$ (wavelength: 589 nm; temperature: 20° C.).

The interval between the two substrates 7a and 7b, that is, the cell gap d, is set at 4.0 μm in the liquid crystal sealed state by dispersing spherical polymer beads between the substrates 7a and 7b. Therefore, Δn.d is equal to 0.296 μm.

The liquid crystal panel is interposed between the two polarizing plates 8a and 8b (for instance, G1220 W of Nitto Denko Corp.). The polarized light transmission axis $\phi_{P_1}$ of one polarizing plate is set at 75° and the polarized light transmission axis $\phi_{P_2}$ of the other polarizing plate is set at −15° which is perpendicular to the former. This embodiment employs a normally closed characteristic in which a dark state is established when the voltage is low ($V_{OFF}$) and a light state is established when the voltage is high ($V_{ON}$).

FIGS. 5(a) to 5(d) schematically show operations in a dark state and a light state, respectively, of the liquid crystal molecules 6 in the lateral electric field type liquid crystal display device of this embodiment.

Figure 5:
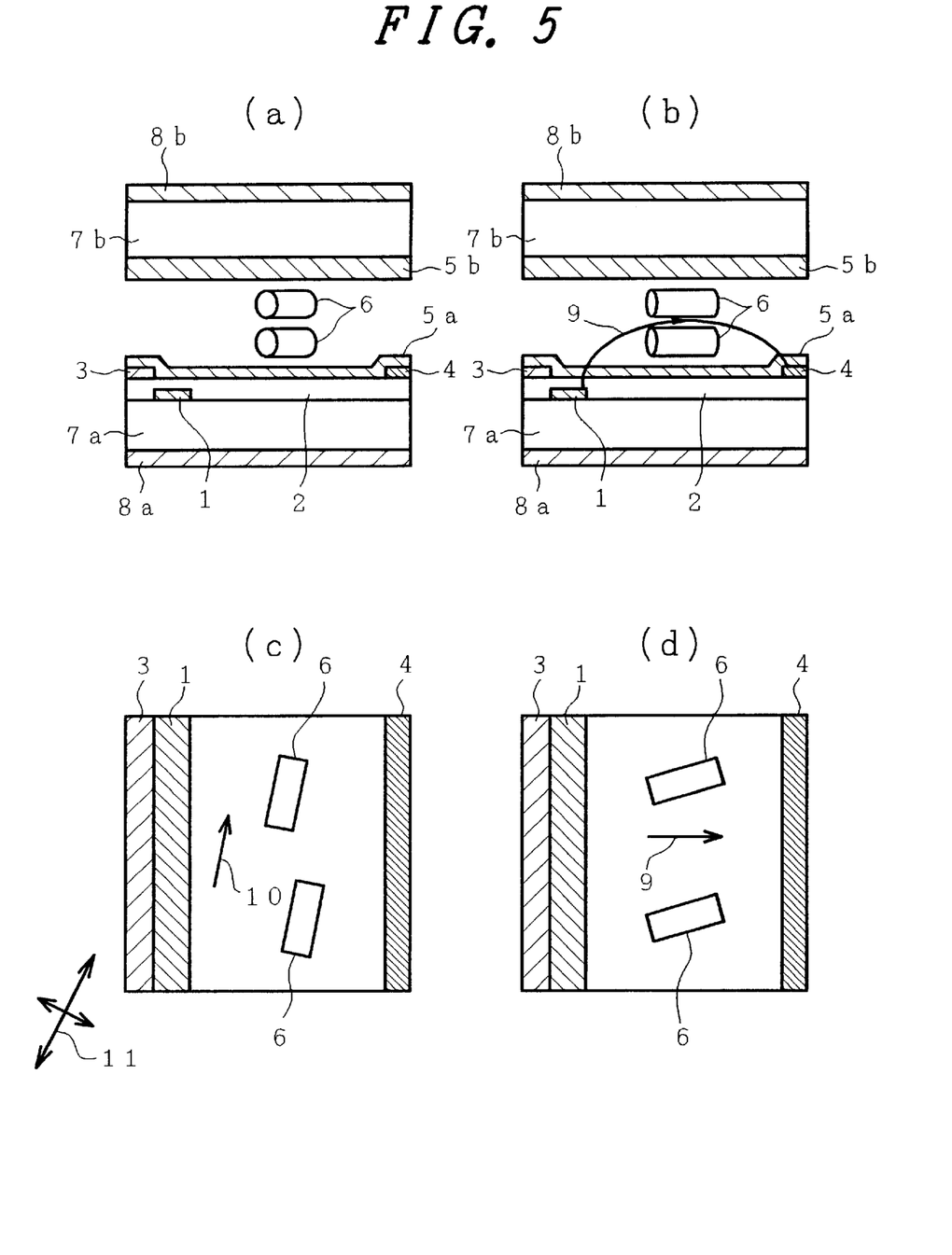
FIGS. 5A–5D are diagrams which schematically show operations in a dark state and a light state of liquid crystal molecules in the lateral electric field type liquid crystal display device of FIG. 1.

FIGS. 5(a) and 5(b) are sectional views showing a dark state (the application voltage is $V_{OFF}$) and a light state ($V_{ON}$), respectively. FIGS. 5(c) and 5(d) are plan views showing the dark state and the light state, respectively.

In the dark state shown in FIGS. 5(a) and 5(c), since no electric field exists between the common electrode 1 and the pixel electrode 4, the liquid crystal molecules 6 are in the initial alignment state. Therefore, illumination light coming from a backlight (not shown) that is provided on the bottom surface of the bottom substrate 7a does not reach the top substrate 7b side.

On the other hand, in the light state shown in FIGS. 5(b) and 5(d), since an electric field 9 exists between the common electrode 1 and the pixel electrode 4, the alignment direction of the liquid crystal molecules 6 is rotated by the electric field 9. Therefore, illumination light coming from the backlight reaches the top substrate 7b side.

As described above, in the lateral electric field type liquid crystal display device of this embodiment, an image is formed by switching between the dark state and the light state by rotating the liquid crystal molecules 6 laterally, that is, in the plane parallel with the substrate surfaces.

Figures 6A, 6B, 6C:
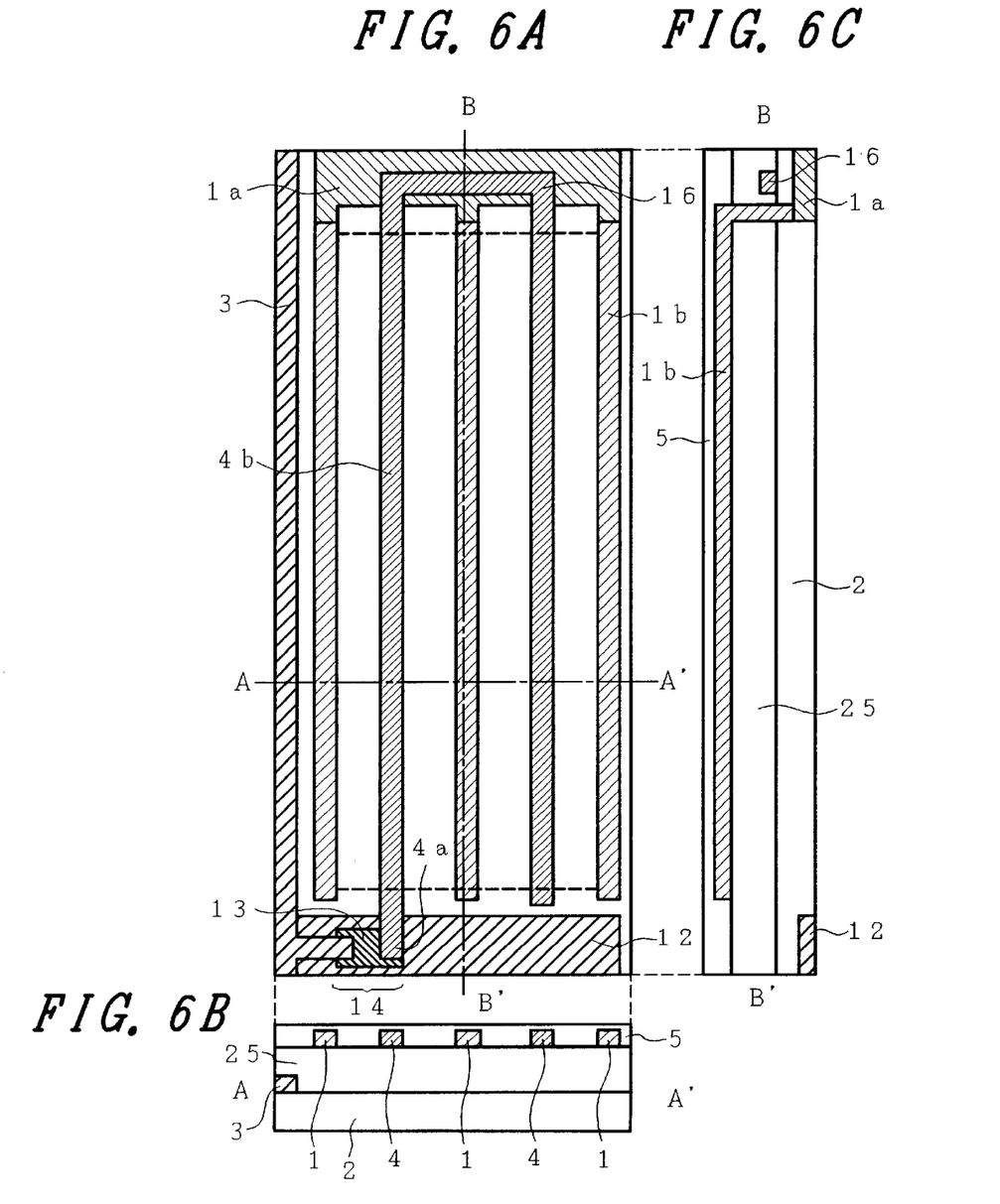
FIGS. 6A–6C are sectional views which illustrate the electrode structure of the active matrix liquid crystal display device of FIG. 1.

FIGS. 6A–6C illustrate the electrode structure of the active matrix liquid crystal display device of this embodiment. FIG. 6A is a plan view as viewed in the direction perpendicular to the substrates 7a and 7b, FIG. 6B is a sectional view taken along line A—A' in FIG. 6A, and FIG. 6C is a sectional view taken along line B—B' in FIG. 6A.

Each thin-film transistor (TFT) 14 is composed of a pixel electrode (source electrode) 4, a video signal electrode (drain electrode) 3, a scanning electrode (gate electrode) 12, and an amorphous silicon (a-Si) layer 13. The scanning electrode 12, a portion 1a of the common electrode 1, the video signal electrode 3, and a portion 4a of the pixel electrode 4 are formed by patterning the same metal layer. After an insulating film 25 is formed, a portion 1b, for driving the liquid crystal, of the common electrode 1 is connected to the portion 1a via a through-hole, and, similarly, a portion 4b of the pixel electrode 4 is brought into contact with the portion 4a via a through-hole in the transistor region. The portion 1b of the common electrode 1 and the portion 4b of the pixel electrode 4 are made of ITO.

A capacitance element 16 operating as a storage capacitor is formed in such a manner that an insulating protective film (gate insulating film) 2 is interposed between the pixel electrode 4 and the common electrode 1 in a region where the three branches of the common electrode 1 are connected to each other. As shown in FIG. 6A, the pixel electrode 4 is provided between the three branches of the common electrode 1. The horizontal pixel pitch (i.e., the pitch of the video signal electrodes 3) is 100 μm and the vertical pixel pitch (i.e., the pitch of the scanning electrodes 12) is 300 μm. The scanning electrode 12, the video signal electrode 3, and the wiring portion (i.e., the portion extending in the direction (right-left direction in FIG. 7A (described later)) parallel with the scanning electrode 12) of the pixel electrode 1, all of which are wiring electrodes bridging a plurality of pixels, are made wide to avoid line defects. Their widths are set at 10 μm, 8 μm, and 8 μm, respectively.

On the other hand, those portions of the pixel electrode 4 and the common electrode 1 which extend in parallel with the longitudinal direction of the video signal electrode 3 and which are formed independently on a pixel-by-pixel basis are made somewhat narrow and their widths are set at 5 μm and 6 μm, respectively. Although making the widths of these portions of the pixel electrode 4 and the common electrode 1 narrow increases the possibility of disconnection due to mixing with foreign substances or the like, such a defect amounts to only a partial defect of one pixel and is not a line defect. The video signal electrode 3 and the common electrode 1 are provided at an interval of 2 μm via the insulating film 25. The number of pixels is made equal to 640×3×480 by using 640×3 (R, G, and B) video signal electrodes 3 and 480 scanning electrodes 12.

Figures 7A, 7B, 7C:
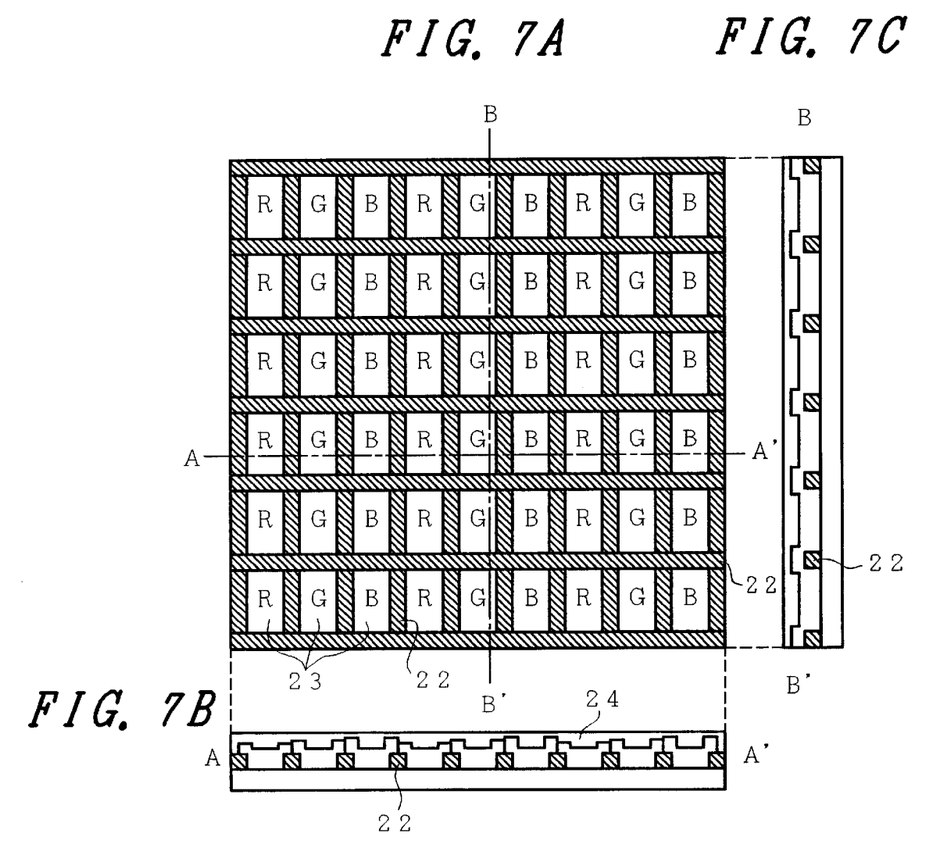
FIGS. 7A–7C are sectional views which illustrate the structure of a color filter substrate having a black matrix (BM)

FIGS. 7A–7C illustrate the structure of a color filter substrate having a black matrix (BM). FIG. 7A is a plan view as viewed in the direction perpendicular to the substrate surface, FIG. 7B is a sectional view taken along line A—A' in FIG. 7A, FIG. 7C is a sectional view taken along line B—B' in FIG. 7A.

The black matrix 22 is made of a mixed material of carbon and an organic pigment. The arrangement of the black matrix 22 with respect to the electrode substrate is indicated by broken lines in FIG. 6A.

After the formation of the black matrix 22, the color filters 23 are formed by dispersing respective pigments of R, G, and B colors in a photosensitive resin and then subjecting the photosensitive resin to coating, patterning exposure, and development. Then, the color filters 23 are coated with an epoxy-type polymer thin film as the overcoat film 24.

The active matrix liquid crystal display device of the first embodiment that was produced in the above manner provided a wide viewing angle of 80° or more in each of the upward, downward, rightward, and leftward directions within which viewing angle a contrast value of 10 or more is secured and no inversion in gradation occurs, in addition to producing an image display with a superior display uniformity.

Embodiment 2

The second embodiment of the invention is the same as the first embodiment except for the following points.

In this embodiment, polyimide is used as the material of the alignment layer of the active element substrate, and alignment ability is imparted to the alignment layer by illuminating its surface with polarized light UV. A KrF excimer laser (wavelength: 248 nm) is used as a light source for emitting polarized light. The illumination energy density is set at 5 mJ/cm² and 51 shots of light are applied. The substrate can be scanned at a constant speed, and the substrate feed speed is set so that the illumination surface is uniformly illuminated with 51 shots of polarized light UV.

The very surface of the other substrate, that is, the color filter substrate with a black matrix is coated with polyimide and then subjected to a rubbing treatment. Liquid crystal molecules are aligned in the direction perpendicular to the polarization direction of polarized light. In this embodiment, the easily alignable axes of the molecules at the interfaces between the liquid crystal and the top and bottom alignment layers are set so as to be approximately parallel with each other and to form an angle of 75° with the electric field direction in each pixel ($\phi_{LC1}=\phi_{LC2}=75°$).

The active matrix liquid crystal display device of this embodiment that was produced in the above manner provided a wide viewing angle of 80° or more in each of the upward, downward, rightward, and leftward directions within which viewing angle a contrast value of 10 or more is secured and no inversion in gradation occurs, as well as a superior display uniformity. Further, the response time (sum of a time taken for the brightness to increase from 0% to 90% after turning-on of a voltage and a time taken for the brightness to decrease from 100% to 10% after turning-off of a voltage) was 48 ms.

Embodiment 3

The third embodiment of the invention is the same as the first embodiment except for the following points.

In this embodiment, polyimide is used as the material of the alignment layer of the active element substrate, and alignment ability is imparted to the alignment layer by illuminating its surface with polarized light UV. A KrF excimer laser (wavelength: 248 nm) is used as a light source for emitting polarized light. The illumination energy density is set at 5 mJ/cm$^2$ and 51 shots of light are applied. The substrate can be scanned at a constant speed, and the substrate feed speed is set so that the illumination surface is uniformly illuminated with 51 shots of polarized light UV.

The very surface of the other substrate, that is, the color filter substrate with a black matrix is coated with polyimide and then subjected to a rubbing treatment. Liquid crystal molecules are aligned in the direction perpendicular to the polarization direction of polarized light. In this embodiment, polarized light UV is applied two times to each of the top and bottom substrates while proper masks are used so that the easily alignable axes of the molecules at the interfaces between the liquid crystal and the top and bottom alignment layers are set so as to be approximately parallel with each other and to form angles 89° ($\phi_{LC1}=\phi_{LC2}=89°$) and 91° ($\phi_{LC1}=\phi_{LC2}=91°$) with the electric field direction in each pixel as shown in FIG. 4.

The active matrix liquid crystal display device of this embodiment that was produced in the above manner provided a wide viewing angle of 80° or more in each of the upward, downward, rightward, and leftward directions within which viewing angle a contrast value of 10 or more is secured and no inversion in gradation occurs, in addition to providing a uniform display performance with extremely small color shifts.

Embodiment 4

The fourth embodiment of the invention is the same as the first embodiment except for the following points.

In this embodiment, a liquid crystal mixed with a cyano compound hating resistivity of $4\times10^{12}\Omega$. cm before sealing is used. The liquid crystal that remained in a liquid crystal plate after the sealing had a resistivity of $2\times10^{11}\Omega$. cm.

An active matrix liquid crystal display device that was produced in the above manner provided a wide viewing angle of 80° or more in each of the upward, downward, rightward, and leftward directions within which viewing angle a contrast value of 10 or more is secured and no inversion in gradation occurs, as well as providing a superior display uniformity. Further, no afterimage was found.

Figure 10:
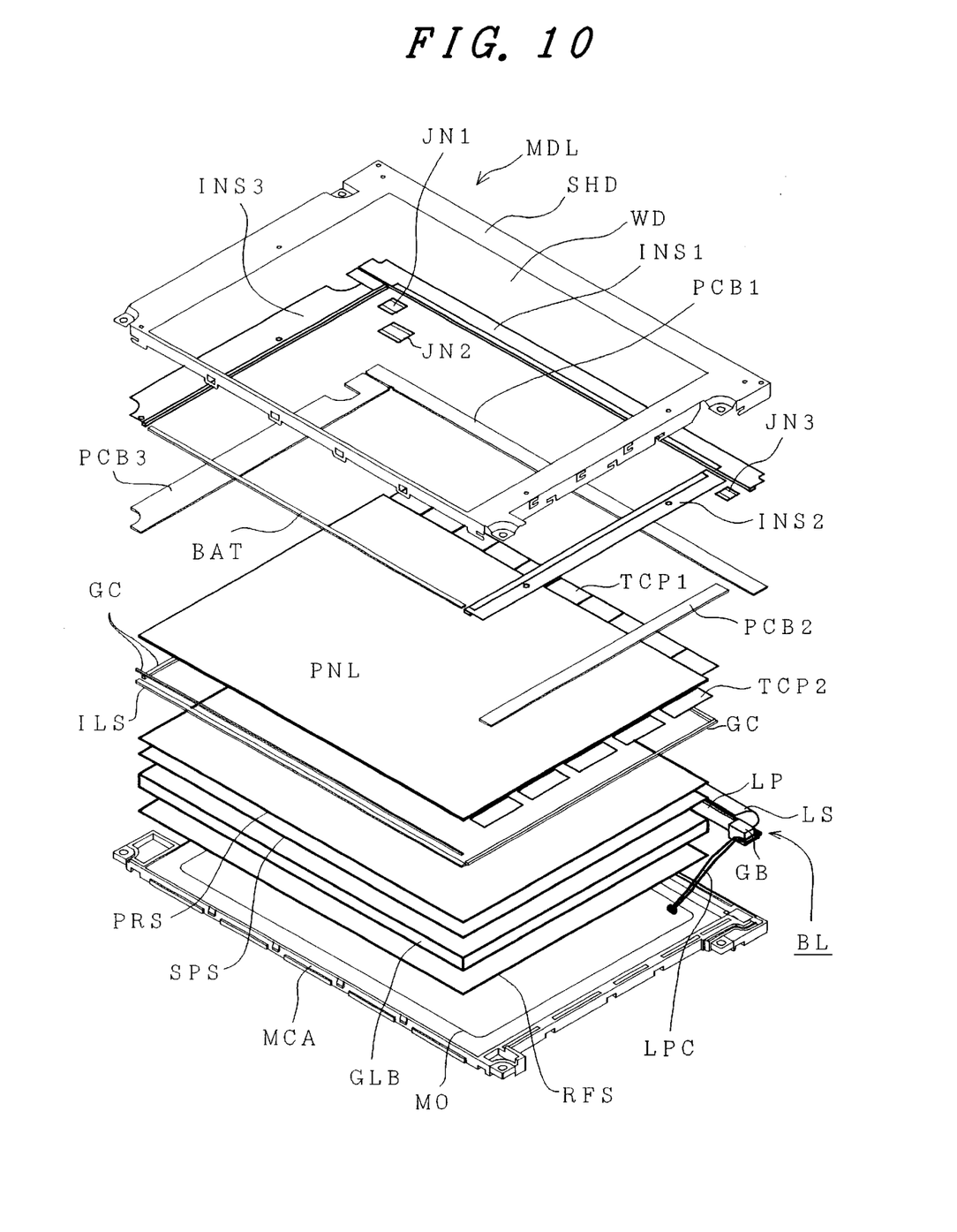
FIG. 10 is a developed perspective view showing the entire configuration of an active matrix liquid crystal display device according to the invention.

FIG. 10 is a developed perspective view showing the overall configuration of an active matrix liquid crystal display device according to the invention. That is, FIG. 10 shows a specific configuration of the liquid crystal display device of the invention (hereinafter called a module MDL in which a liquid crystal display panel, circuit boards, a backlight, and other constituent members are integrated).

Symbol SHD denotes a shield case (also called a metal frame) made of sheet metal; WD denotes a display window; and INS1–3 denotes insulating sheets. Symbols PCB1–3 denote circuit boards, that is, they denote a drain-side circuit board (video signal lines driving circuit board), a gate-side circuit board, and an interface circuit board, respectively. Symbols JN1–3 denote joiners that electrically connect the circuit boards PCB1–3 to each other. Symbols TCP1 and TCP2 denote tape carrier packages; PNL denotes a liquid crystal panel); GC denotes rubber cushions; ILS denotes a light shield spacer); PRS denotes a prism sheet; SPS denotes a diffusion sheet; GLB denotes a light guide plate; RFS denotes a reflection sheet; MCA denotes a bottom case (mold frame) formed by integral molding; MO denotes an opening of the bottom case MCA; LP denotes a fluorescent tube; LPC denotes a lamp cable; GB denotes a rubber bush that supports the fluorescent tube LP; BAT denotes a double-sided adhesive tape; and BL denotes a backlight composed of the fluorescent tube LP, the light guide plate GLB, and other components. The liquid crystal module MDL is assembled by stacking the diffusion plate members in the arrangement shown in FIG. 10.

The liquid crystal module MDL has two kinds of accommodation/holding members, that is, the bottom case MCA and the shield case SHD. The liquid crystal module MDL is assembled by combining together the metal shield case SHD in and to which the insulating sheets INS1–3, the circuit boards PCB1–3, and the liquid crystal panel PNL are accommodated and fixed and the bottom case MCA that accommodates the backlight BL that is composed of the fluorescent tube LP, the light guide plate GLB, the prism sheet PRS, and other components.

The video signal line driving circuit board PCB1 is mounted with an integrated circuit chip for driving the pixels of the liquid crystal display panel PNL. The interface circuit board PCB3 is mounted with an integrated circuit chip for receiving video signals from an external host and control signals, such as a timing signal, a timing converter TCON for generating a clock signal by processing the timing signal, and other elements.

The clock signal generated by the timing converter TCON is supplied to the integrated circuit chip that is mounted on the video signal line driving circuit board PCB1 via clock signal lines CLL that are formed on the interface circuit board PCB3 and the video signal line driving circuit board PCB1.

Each of the interface circuit board PCB3 and the video signal line driving circuit board PCB1 is a multilayered wiring board. Each clock signal line CLL is formed as an intermediate-layer wiring line of the interface circuit board PCB3 or the video signal line driving circuit board PCB1.

The drain-side circuit board PCB1 for driving the TFTs, the gate-side circuit board PCB2, and the interface circuit board PCB3 are connected to the liquid crystal panel PNL by the tape carrier packages TCP1 and TCP2. The circuit boards PCB1–3 are connected to each other by the joiners JN1–3.

The liquid crystal display panel PNL forms the above-described lateral electric field type active matrix liquid crystal display device according to the invention. Its alignment layers have been given liquid crystal alignment ability by using polarized light as described in the above embodiments.

Figure 11:
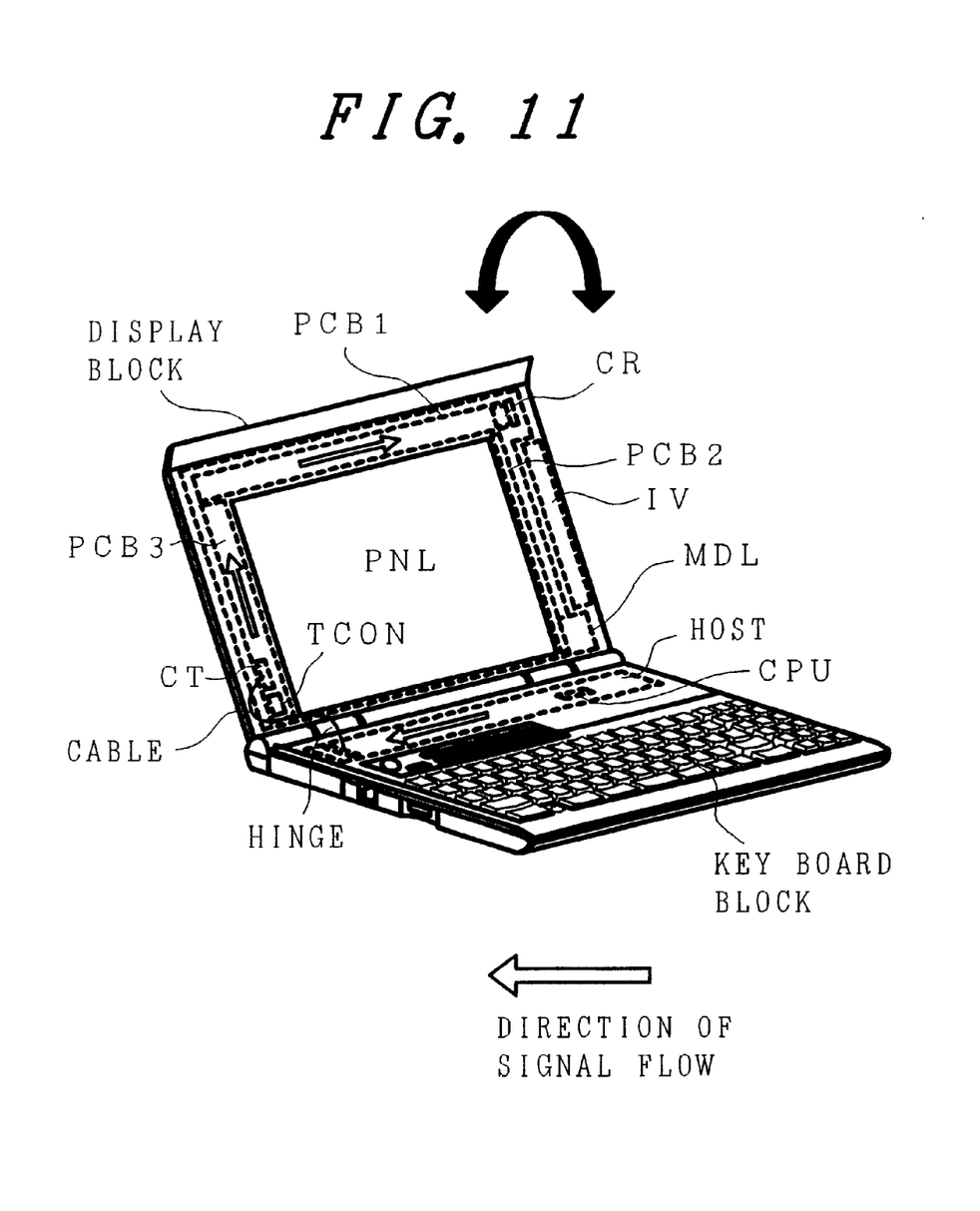
FIG. 11 is a perspective view which shows an appearance of a personal computer as an example of an information processing apparatus in which the liquid crystal display device of the invention is mounted.

FIG. 11 shows the appearance of a personal computer representing an example of an information processing apparatus in which the liquid crystal display device of the invention is mounted. In FIG. 11, the same symbols as in FIG. 10 denote the same members as in FIG. 10. Symbol IV denotes an inverter power supply for driving the fluorescent tube LP, and CPU denotes a host-side central processing unit.

As shown in FIG. 11, in the personal computer in which the liquid crystal display device of the invention is mounted, since the video signal line driving circuit board (horizontal driving circuit board) drain-side circuit board) PCB1 is provided only above the screen, a spatial margin is obtained below the display section (on the keyboard side), and so the space (hinge space) where hinges are provided for connecting the keyboard section and the display section to each other can be made small. Therefore, the outer size of the display section can be reduced, and, hence, the size of the entire personal computer can also be reduced.

As described above, according to the invention, in a lateral electric field type display device, a liquid crystal is aligned by applying polarized light to a thin film of an alignment layer material, such as a polyimide-type organic film. Therefore, an active matrix liquid crystal display device can be obtained in which both the viewing angle and the display uniformity are improved from conventional devices of the lateral electric field type.

What is claimed is:

1. A method for checking the alignment ability of an alignment layer to be used in an active matrix liquid crystal display device, the active matrix liquid crystal display device comprising:

a first substrate and a second substrate, the first substrate carrying scanning signal electrodes, video signal electrodes and pixel electrodes, all of which constitute display pixels, and active elements, the electrodes constituting the display pixels being formed so as to apply, to a liquid crystal layer, an electric field that is substantially parallel with surfaces of the first substrate and a second substrate, and being connected to external control means for controlling the electric field in accordance with a desired display pattern;

a first alignment layer formed, directly or via an insulating layer, as a top layer on the electrodes constituting the display pixels and the active elements;

the second substrate being bonded to the first substrate with a very small interval provided in between, the second substrate being provided with a second alignment layer that is formed so as to confront the first alignment layer;

a liquid crystal layer provided in said interval between the first and second alignment layers; and polarizing means for changing an optical characteristic of light to be output from the second substrate in accordance with an alignment state of the liquid crystal layer that is produced by the electric field applied to the liquid crystal layer;

the method comprising the steps of:

forming a thin film made of a polyimide-type polymer material as an alignment layer that is a first or second alignment layer on a surface of a substrate that is the first or second substrate; and applying polarized light to the polyimide-type polymer thin film while moving the substrate at a constant feed speed, to thereby inpart alignment ability to the alignment layer; and checking whether alignment ability has been imparted to the alignment layer that has been formed based on a result of an examination as to whether an alignment control state exists before and after the substrate on which the alignment layer is formed is heated at approximately 180° C. for 10 minutes.

2. The method according to claim 1, wherein a pre-tilt angle at an interface between the first alignment layer and the first substrate is different from a pre-tilt angle at an interface between the second alignment layer and the second substrate.

3. The method according to claim 1, wherein each of the first and second alignment layers is made of a polyimide-type polymer material.

4. The method according to claim 1, wherein each of the first and second alignment layers has two or more alignment directions when no electric field is applied.

5. The method according to claim 1, wherein the liquid crystal layer has a resistivity value smaller than $10^{13}$ Ω. cm.

6. The method according to claim 1, wherein the insulating film has a thickness of 0.3 $\mu$m or more.

7. The method according to claim 1, wherein a surface of the first substrate adjacent to the liquid crystal layer has height differences of 0.3 $\mu$m or more.

8. The method according to claim 1, wherein the polyimide-type polymer material is one in which photochromic units are introduced chemically.

9. The method according to claim 1, wherein the polarized light is applied in two or more directions.

10. The method according to claims 2, 3, 4–7 and 8–1, wherein one of the first and second alignment layers is given alignment ability by rubbing.

* * * * *